Patented Sept. 4, 1934

1,972,432

UNITED STATES PATENT OFFICE 1,972,432

PRODUCTION OF PURE ALUMINIUM-
SILICON ALLOYS

Conway (Baron) von Girsewald, Frankfort-on-the-Main, and Oskar Schober, Horrem, near Cologne-on-the-Rhine, Germany, assignors to American Lurgi Corporation, New York, N. Y., a corporation of New York No Drawing. Application December 3, 1931, Serial No. 578,846. In Germany December 18, 1930

5 Claims. (Cl. 75—58)

The present invention relates to the production of pure aluminium silicon alloys from impure initial alloys obtained for example by an electrothermal process.

In manufacturing aluminium silicon alloys by the electro-thermic reduction of aluminium oxide or materials containing aluminium oxide, in the presence of silica or materials containing silica, and carbon, a difficulty arises by the fact, that the alloy produced is, in a high degree, inclined to combine with such quantities of carbon (originating for instance from the electrodes), that it becomes spongy and sticky and cannot be tapped from the furnace. It is possible to diminish the absorption of carbon to a great extent by using silica in such a quantity, that the alloys obtained contain more than 30% of silicon, whereby they are rendered fluid and suitable to be tapped easily. Nevertheless not only the remaining small quantities of carbon are objectionable for many purposes of practical use, but there are often also other undesirable impurities present in the alloy, for example, oxidic or ferriferous impurities, such as non-reduced particles of the originating materials containing aluminium oxide.

For manufacturing aluminium silicon alloys with a silicon content of less than 30% by an electrothermal method, it has been proposed, to submit the alloys originally produced in the furnace, containing more than 30% of silicon, to a liquation process at a lower temperature. Hereby an alloy richer in silicon is obtained in the form of a liquation residue, containing for instance the carbidic and oxidic impurities mentioned above, while the liquid metal separated from the liquation residue, is free from these impurities. This process however involves not only a more or less considerable reduction of the silicon contents in the initial alloy, but it is dependent also upon the possibility of utilizing the liquation residues rich in silicon, containing the impurities referred to.

Surprisingly it has been found now, that it is possible to remove the impurities from the aluminium silicon alloys produced in the electro-thermic furnace, as well as from other aluminium silicon alloys similarly contaminated, in a most simple manner by filtering the liquid alloys through a bed of granular to fairly coarse grained refractory material such as felspar, firebrick, granite, or the like at temperatures at which a separation of solid constituents rich in silicon does not yet, or at least not to a considerable extent, take place. Such beds may be placed upon a grate, or a perforated plate, or the like, made of suitable material, for instance iron.

It is of great advantage to use as a filtering bed materials such as alumina or quartz, which, when the permeability of the filtering bed is found to be diminishing, may be introduced together with the filtration residues that have remained on them into the process for producing the aluminium silicon initial alloys for example by way of electrothermal reduction, instead of other starting materials containing alumina and silica.

One may also use as a filtering bed materials consisting of silicon or an aluminium alloy rich in silicon, such as are obtained by bringing an aluminium silicon alloy rather rich in silicon to such a temperature above the melting point of the eutectic, at which a portion of the silicon present, in given cases combined with aluminium, is present in the solid form and by separating the solid portions from the liquid remainder of the mixture by filtration, or by centrifuging or by other suitable methods.

The filtration can easily be carried out by using a pressure filtering apparatus (resembling the known suction funnels used in chemical laboratories) into which the filtering bed is suitably placed and which can be airtightly closed by a cover. The liquid alloy is poured on to the filtering bed, and the receptacle closed with the cover. Then a suitable, preferably preheated gas or a mixture of gases is pressed into the space above the alloy, using a sufficiently high pressure, which may be several atmospheres, for example, ½ to 10 atmospheres, above the atmospherical pressure. Hereby the liquid metal is pressed through the filtering bed in a pure condition, leaving behind the carbidic, oxidic, and other impurities.

The size of grain of the filtering material used may be chosen according to the kind of impurities to be eliminated, for example from 1 to 6 mm., or advantageously from 2 to 4 mm. Various sizes of grain may be used in given cases. Preferably two or more layers of different sizes are used, diminishing in thickness from below to above. The height of the filtering bed may be, for instance, 1 to 10 cm., heights of 3 to 8 cm. having generally been found to be satisfactory.

For pressing the alloy through the filtering bed, any gases or mixtures of gases may be used, which are sufficiently inert, not to react upon the alloys at the temperatures prevailing in the filtering apparatus, such as, for example, air, carbon dioxide, nitrogen or the like, which, in order to avoid any undesirable influences of moisture contained therein upon the hot metal, are preferably used in a dry or pre-dried condition.

Instead of using gas pressure, the filtration may be carried out by centrifugal power or by suction, the application of gases under pressure generally being found to be more simple and advantageous.

In working in the described manner care has to be taken during the filtration process, not to allow the temperature of the alloy to drop below the limit, at which a separation of solid fractions rich in silicon sets in.

The process may be carried out, for example, in the following manner. The alloy which is to be purified is poured on to the, for example, preheated, filtering bed at such a temperature, that during the filtration which has to follow immediately if possible, its temperature cannot, or not considerably drop below the limit in question. This of course is realized the easier, the smaller the content of silicon in the alloy under treatment, and the lower therefore the limit of temperature at which solid fractions begin to separate. Further it was found, that the purifying effect of the filter is generally better, if the filtering temperature is not far too high.

As it will be generally the intention to produce such alloys whose silicon content is lower than 30, preferably even lower than 20%, it has proved to be useful, first to dilute the alloys, leaving the electric furnace with a silicon content of, for example 33%, with aluminium to a lower content of silicon, and then to subject them to filtration. This whole procedure may be preferably effectuated in a single run, in such a manner, that the heat, contained in the initial alloy as it comes out of the furnace, is sufficient to supply the heat required for alloying with aluminium as well as that required in the filtering operation.

For this purpose, the initial alloy rich in silicon is preferably caused to run immediately from the furnace into a tapping-pot containing the quantity of aluminium required for alloying, for instance, in the form of sheet-metal-cuttings. The alloy obtained in this manner with a lowered content of silicon which may, for example, amount to about 25%, or, if required, to more or less, for instance, to not more or even less than 13%, is then filtered immediately and may, after filtration and, if necessary, after remelting, subsequently be given exactly the aluminium content desired, by the addition of further quantities of aluminium.

Alternatively one may attain the exact composition already before the filtration of the alloy by weighing the tapping-pot, containing approximately the quantity of aluminium required, before and after tapping the initial alloy, and, having established the increase of weight, adding the missing quantity of aluminium.

In addition to the advantages connected with the employment of low filtering temperatures as mentioned above, this mode of working has the further advantage of not being dependent upon using pure aluminium for alloying with the initial alloy rich in silicon. On the contrary one may just as well use, for example, sheet-metal-cuttings, even if they contain a considerable amount of impurities, because these impurities would be retained to a large extent in the subsequent filtering process.

In applying the filtering process described, in conjunction with the electrothermic production of the initial alloys from originating materials containing alumina and silica, the filtration residues may, if desired, together with the material forming the filtering bed, such as granular aluminium oxide or quartz, unhesitatingly be returned into the electrothermic process in order to utilize the small quantities of aluminium and silicon contained therein.

*Example*

100 kgs. of an aluminium-silicon initial alloy produced by an electrothermal method, containing 33% Si, are alloyed with 43 kgs. of aluminium, practically free from silicon. The result is an intermediate alloy with 23% Si, weighing 143 kgs.

These 143 kgs. are filtered through granular quartz, the result being 125 to 135 kgs. of a practically pure aluminium-silicon alloy with 23% Si, while the rest, which does not considerably differ in its silicon content from the filtered alloy, and which contains all impurities, may unhesitatingly be returned into the electrothermic process.

We claim:—

1. A method of producing a pure aluminium-silicon alloy which comprises filtering a molten aluminium-silicon alloy containing non-metallic, especially carbidic, impurities, at a temperature at which no substantial segregation of metallic silicon in solid form occurs, through a filter bed prepared of granular refractory material selected from the group consisting of quartz, alumina, silicon and residues rich in silicon from the liquation of aluminium-silicon alloys.

2. A method of producing a pure aluminium-silicon alloy which comprises filtering a molten aluminium-silicon alloy obtained by a thermic reduction process at a temperature at which no substantial segregation of metallic silicon in solid form occurs, through a filter bed prepared of granular refractory material selected from the group consisting of quartz, alumina, silicon and residues rich in silicon from the liquation of aluminium-silicon alloys.

3. A method of producing a pure aluminium-silicon alloy which comprises filtering a molten aluminium-silicon alloy containing non-metallic, especially carbidic, impurities, at a temperature at which no substantial segregation of metallic silicon in solid form occurs, through a filter bed prepared of granular alumina.

4. A method of producing a pure aluminium-silicon alloy which comprises filtering a molten aluminium-silicon alloy containing non-metallic, especially carbidic, impurities, at a temperature at which no substantial segregation of metallic silicon in solid form occurs, through a filter bed prepared of granular residues rich in silicon from the liquation of aluminium-silicon alloys.

5. A method of producing a pure aluminium-silicon alloy which comprises mixing with an aluminium-silicon alloy, rich in silicon, obtained by a thermic reduction process, a predetermined quantity of aluminium and thereafter filtering the alloy in the liquid condition at a temperature at which no substantial segregation of metallic silicon in solid form occurs, through a filter bed prepared of granular refractory material selected from the group consisting of quartz, alumina, silicon and residues rich in silicon from the liquation of aluminium-silicon alloys.

CONWAY, BARON von GIRSEWALD.
OSKAR SCHOBER.